(12) United States Patent
Kelford et al.

(10) Patent No.: US 11,073,105 B2
(45) Date of Patent: Jul. 27, 2021

(54) ACOUSTIC TORQUE BOX

(71) Applicant: Rohr, Inc., Chula Vista, CA (US)

(72) Inventors: Bryce T. Kelford, San Diego, CA (US); Pablo T. Sanz Martinez, San Diego, CA (US); Jose S. Alonso-Miralles, Chula Vista, CA (US)

(73) Assignee: Rohr, Inc., Chula Vista, CA (US)

(*) Notice: Subject to any disclaimer, the term of this patent is extended or adjusted under 35 U.S.C. 154(b) by 191 days.

(21) Appl. No.: 16/149,676

(22) Filed: Oct. 2, 2018

(65) Prior Publication Data

US 2020/0102908 A1 Apr. 2, 2020

(51) Int. Cl.
*F02K 1/82* (2006.01)
*F02K 1/72* (2006.01)
*G10K 11/168* (2006.01)

(52) U.S. Cl.
CPC .......... *F02K 1/827* (2013.01); *F02K 1/72* (2013.01); *G10K 11/168* (2013.01); *F05D 2220/323* (2013.01); *F05D 2250/283* (2013.01); *F05D 2260/96* (2013.01)

(58) Field of Classification Search
CPC ... F02K 1/827; F02K 1/82; F02K 1/80; F02K 1/72; F02K 1/70
See application file for complete search history.

(56) References Cited

U.S. PATENT DOCUMENTS

| | | | |
|---|---|---|---|
| 5,153,522 A | 10/1992 | Sano | |
| 5,782,082 A * | 7/1998 | Hogeboom | F02K 1/827 60/226.1 |
| 6,394,414 B1 | 5/2002 | Breitling et al. | |
| 6,679,222 B1 | 1/2004 | Reischl et al. | |
| 8,543,314 B2 | 9/2013 | Nakata et al. | |
| 8,714,140 B2 | 5/2014 | Borchsenius et al. | |
| 8,766,509 B2 | 7/2014 | Reichinger et al. | |
| 9,103,294 B2 | 8/2015 | Sujan et al. | |
| 9,151,225 B2 | 10/2015 | Dezeustre et al. | |
| 9,909,471 B2 | 3/2018 | Mattia | |
| 9,989,010 B2 | 6/2018 | Dussol et al. | |
| 2003/0089824 A1* | 5/2003 | Stemberger | F02K 1/72 244/110 B |
| 2008/0148831 A1 | 6/2008 | Kekedjian et al. | |
| 2012/0101707 A1 | 4/2012 | Kemmer et al. | |

(Continued)

FOREIGN PATENT DOCUMENTS

| | | |
|---|---|---|
| CN | 102027221 A | 4/2011 |
| CN | 102318099 A | 1/2012 |

(Continued)

OTHER PUBLICATIONS

EP search report for EP19201097.3 dated Feb. 25, 2020.

*Primary Examiner* — Andrew H Nguyen
(74) *Attorney, Agent, or Firm* — Getz Balich LLC

(57) ABSTRACT

Aspects of the disclosure are directed to a fan ramp for use in a thrust reverser portion of a nacelle of a gas turbine engine, the fan ramp extending circumferentially about an axial fan ramp centerline. The fan ramp comprises a fan ramp forward edge disposed proximate an aft end of a fan case, the fan case at least partially surrounding a fan section of the gas turbine engine. The fan ramp also includes noise attenuating structure at a forward section of the fan ramp forward of a torque box.

12 Claims, 8 Drawing Sheets

(56) References Cited

U.S. PATENT DOCUMENTS

| | | | |
|---|---|---|---|
| 2013/0009005 A1* | 1/2013 | Caruel | F02K 1/805 244/110 B |
| 2014/0124601 A1 | 5/2014 | Imai | |
| 2015/0068610 A1 | 3/2015 | Sommerer et al. | |
| 2015/0108238 A1 | 4/2015 | Grandi | |
| 2015/0108248 A1 | 4/2015 | Aten | |
| 2016/0369743 A1* | 12/2016 | Schrell | F02K 1/625 |
| 2018/0148187 A1 | 5/2018 | Valleroy et al. | |

FOREIGN PATENT DOCUMENTS

| | | |
|---|---|---|
| CN | 102405342 A | 4/2012 |
| DE | 4122348 A1 | 1/1992 |
| DE | 102009045307 A1 | 4/2011 |
| EP | 1895133 A2 | 3/2008 |
| JP | 2000179391 A | 6/2000 |
| WO | WO9413991 A1 | 6/1994 |
| WO | WO2013167675 A1 | 11/2013 |

* cited by examiner

ACOUSTIC TORQUE BOX

BACKGROUND OF THE INVENTION

1. Technical Field

The present disclosure relates to aircraft gas turbine nacelles that include a thrust reverser, and more particularly to aircraft gas turbine nacelles that include a thrust reverser, and a fan ramp that includes noise attenuating structure at a forward section of the fan ramp forward of a torque box.

2. Background Information

It is known to provide an engine system that includes, for example, an engine (e.g., a gas turbine engine), a nacelle that at least partially surrounds the engine, and a pylon that connects the engine and the nacelle to a vehicle (e.g., an aircraft). In some instances, the nacelle includes a thrust reverser, and the thrust reverser includes a fan ramp. There is a need for a thrust reverser fan ramp that includes an improved noise suppression.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a fan ramp for use in a thrust reverser portion of a nacelle of a gas turbine engine, the fan ramp extending circumferentially about an axial fan ramp centerline. The fan ramp comprises a fan ramp forward edge disposed proximate an aft end of a fan case, the fan case at least partially surrounding a fan section of the gas turbine engine. A fan ramp aft edge is disposed proximate a forward end of an array of cascades, the array of cascades being operable to permit a bypass airstream to pass there through during a thrust reversing operation. A noise attenuating structure comprises a perforated layer, a base layer, and a core layer, all of which are stacked in a superimposed relationship so that the core layer is disposed between the perforated layer and the base layer. The perforated layer is configured to permit noise to pass there through, the core layer includes a substructure that is operable to receive an amount of the noise that passes through the perforated layer that is operable to reflect the amount of the noise off the base layer such that sound waves of reflected noise are out of phase with and destructively interfere with sound waves of noise outside the substructure. The core layer comprises and axially extends between a forward axial end proximate the fan ramp forward edge and an aft axial end axially forward a blocker door forward edge, and the core layer is axially forward of a torque box forward bracket that forms the forward boundary of a torque box.

The fan ramp may be exposed to the bypass airstream passing through a bypass duct of the propulsion system during the thrust reversing operation.

The fan ramp aids in guiding the bypass airstream to make a radially outward turn from the bypass duct through the array of cascades during the thrust reversing operation.

The fan ramp centerline may be aligned with an axial centerline of the gas turbine engine included in the propulsion system.

The stacked perforated layer, base layer, and core layer are operable to suppress noise within the bypass duct when a blocker door is in a stowed position.

The stacked perforated layer, base layer, and core layer may be defined by a component of the nacelle that at least partially defines the fan ramp.

The substructure may be honey-comb shaped.

The core layer may not be disposed aft of the torque box forward bracket.

The fan ramp may be free of perforations exposed to the bypass airstream axially aft of the torque box forward bracket.

The forward end of the noise attenuating structure may comprise an edge seal.

The base layer may abut a segment of the torque box forward bracket.

The base layer may abut a segment of the torque box forward bracket.

The base layer may be radially separated from a segment of the torque box forward bracket.

Aspects of the disclosure are also directed to a thrust reversing nacelle for a turbofan propulsion system, the thrust reversing nacelle extending circumferentially about an axial centerline. The thrust reversing nacelle comprises an array of cascades extending circumferentially about the axial centerline and a translating structure operable to be moved in an axial direction between a stowed position, in which the translating structure blocks a bypass airstream from passing from a bypass duct through the array of cascades, and a deployed position, in which the translating structure permits the bypass airstream to pass from the bypass duct through the array of cascades. A blocker door is pivotally mounted to the translating structure, and operable to be moved between the stowed position, in which the blocker door is positioned adjacent to the translating structure and extends generally parallel to the axial centerline, and the deployed position, in which the blocker door is positioned away from the translating structure and extends generally perpendicular to the axial centerline to aid in guiding the bypass airstream from the bypass duct through the array of cascades. A fan ramp guides the bypass airstream from the bypass duct through the array of cascades when the translating structure and the blocker door are in their respective deployed positions, the fan ramp including a perforated layer, a base layer, and a hollow layer, all of which are stacked in a superimposed relationship so that the hollow layer is disposed between the perforated layer and the base layer. The perforated layer is not blocked by the blocker door when the blocker door is in the stowed position, and the hollow layer comprises a hollow layer forward end and a hollow layer aft end, and the hollow layer is forward a blocker door forward edge and forward of a torque box forward bracket that forms the forward boundary of a torque box.

The fan ramp may extend between a forward fan ramp edge and an aft fan ramp edge, wherein the forward fan ramp edge is disposed proximate an aft end of a fan case and the aft fan ramp edge is disposed proximate a forward end of the array of cascades.

The stacked perforated layer, base layer, and hollow layer may be included on a portion of the fan ramp exposed to the bypass duct when the blocker door is in its stowed position.

The fan ramp may be free of perforations exposed to the bypass airstream axially aft of the torque box forward bracket.

The base layer may abut a segment of the torque box forward bracket.

Aspects of the disclosure are also directed to a method of attenuating noise that comprises providing a fan ramp for use in a thrust reverser portion of a nacelle of a gas turbine engine, the fan ramp extending circumferentially about an axial fan ramp centerline, the fan ramp comprising a fan ramp forward edge disposed proximate an aft end of a fan case, the fan case at least partially surrounding a fan section of the gas turbine engine, an fan ramp aft edge disposed proximate a forward end of an array of cascades, the array of cascades being operable to permit a bypass airstream to pass there through during a thrust reversing operation, and a noise attenuating structure comprising a perforated layer, a base layer, and at least one of core layer or a hollow layer, all of which are stacked in a superimposed relationship so that the core layer is disposed between the perforated layer and the base layer. The method also includes porting noise through the perforated layer the base layer such that sound waves of reflected noise are out of phase with and destructively interfere with sound waves of noise outside the substructure, where the at least one of the core layer or hollow layer comprises and axially extends between a forward axial end proximate the fan ramp forward edge and an aft axial end axially forward a blocker door forward edge, and the core layer is axially forward of a torque box forward bracket that forms the forward boundary of a torque box.

The fan ramp may be free of perforations exposed to the bypass airstream axially aft of the torque box forward bracket.

DETAILED DESCRIPTION

Figure 1:
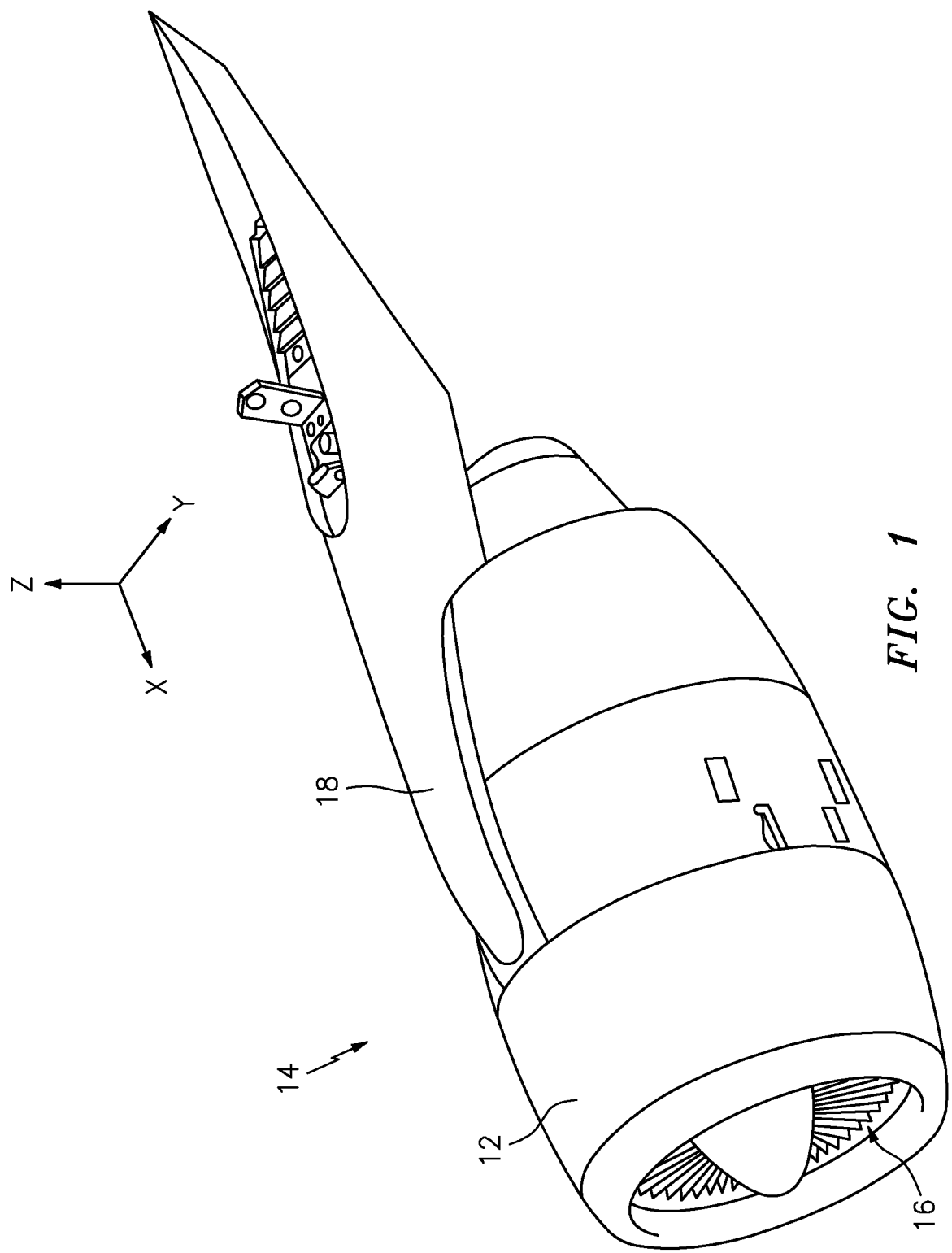
FIG. 1 is a perspective view of an aircraft gas turbine engine.

The present disclosure describes embodiments of a fan ramp 10 (FIGS. 3-7), and embodiments of a nacelle 12 (FIGS. 1-7) that include the fan ramp 10. The present disclosure describes aspects of the embodiments illustrated in the drawings; however, aspects of the present disclosure are not limited to the embodiments illustrated in the drawings. The present disclosure may describe one or more features as having a length extending relative to an x-axis, a width extending relative to a y-axis, and/or a height extending relative to a z-axis. The drawings illustrate the respective axes.

The present disclosure uses the terms or phrases "circumferential", "annular", "abut", and "noise suppression", and variations thereof, to describe one or more features. The term "circumferential", and variations thereof, are used herein to indicate that a feature extends along a curve that is centered about an axis of rotation. The term "annular", and variations thereof, are used herein to indicate that a feature is at least partially in the form of a ring (e.g., a ring in a circular shape or another shape). The term "abut", and variations thereof, are used herein to indicate either that a feature is in direct contact with another feature, or that a feature is in such close proximity to another feature that it is almost in direct contact with that feature. The phrase "noise suppression", and variations thereof, are used herein to indicate than an amplitude of a sound wave is reduced.

Figure 2:
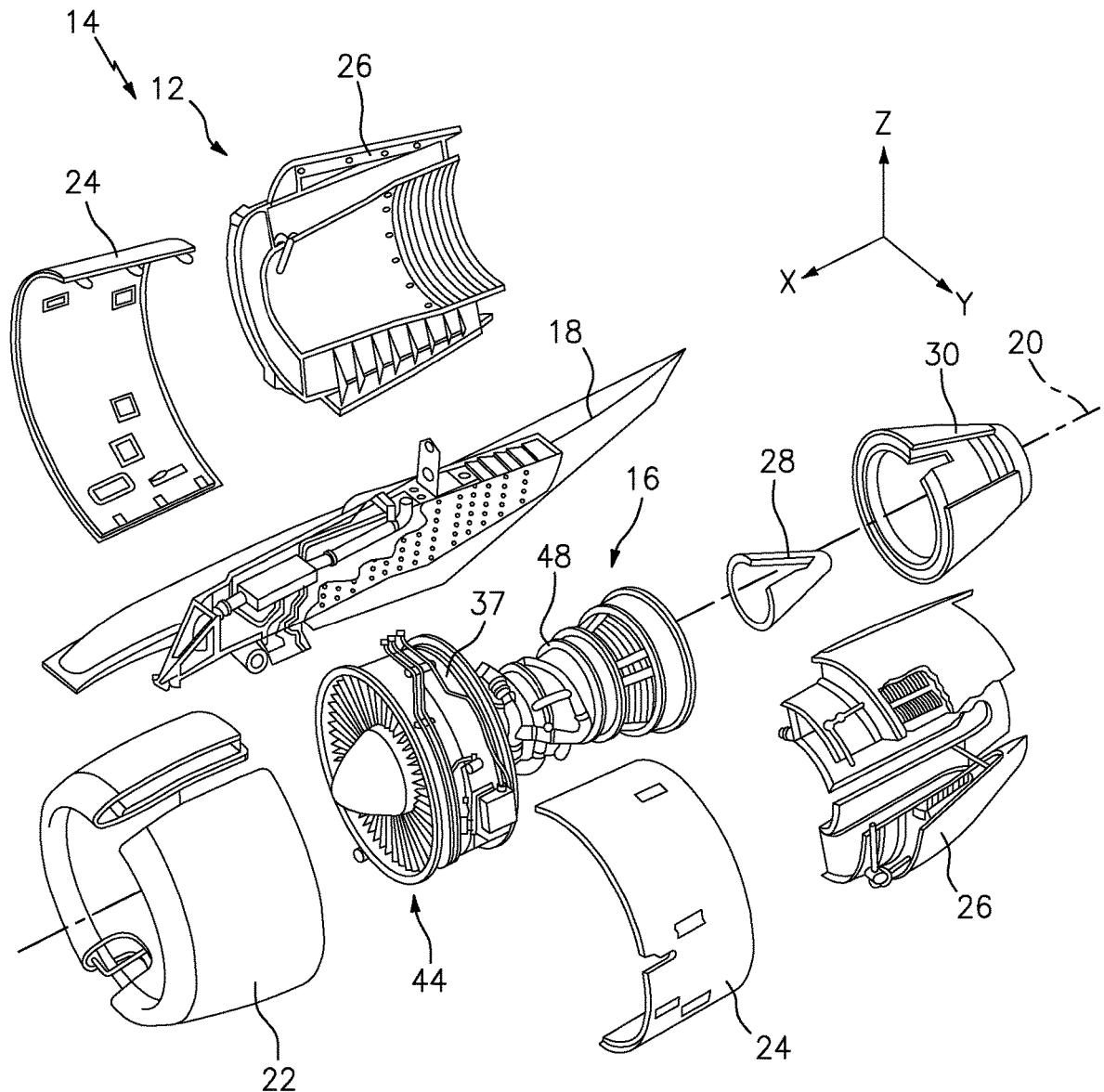
FIG. 2 is an exploded perspective view of the engine of FIG. 1.

Referring to FIGS. 1 and 2, the fan ramp 10 (FIGS. 3-6, and 8) is included in a nacelle 12, and the nacelle 12 is included in an aircraft gas turbine engine system 14. The engine system 14 and the nacelle 12 can be configured in various different ways. In the embodiment illustrated in FIG. 1, the engine system 14 is a turbofan that includes a gas turbine engine 16 and a pylon 18 in addition to the nacelle 12. In the embodiment illustrated in FIG. 2, the gas turbine engine 16 extends in a lengthwise direction along an axial centerline 20. The nacelle 12 partially surrounds the gas turbine engine 16 and the pylon 18 connects the nacelle 12 and the gas turbine engine 16 to the underside of an aircraft wing (not shown). In this embodiment, the nacelle 12 includes an inlet 22, a fan cowl 24, a thrust reverser 26, an exhaust centerbody 28, and an exhaust nozzle 30. In this embodiment, the fan ramp 10 (FIGS. 3-6, and 8) is included in the thrust reverser 26 portion of the nacelle 12.

Figure 3:
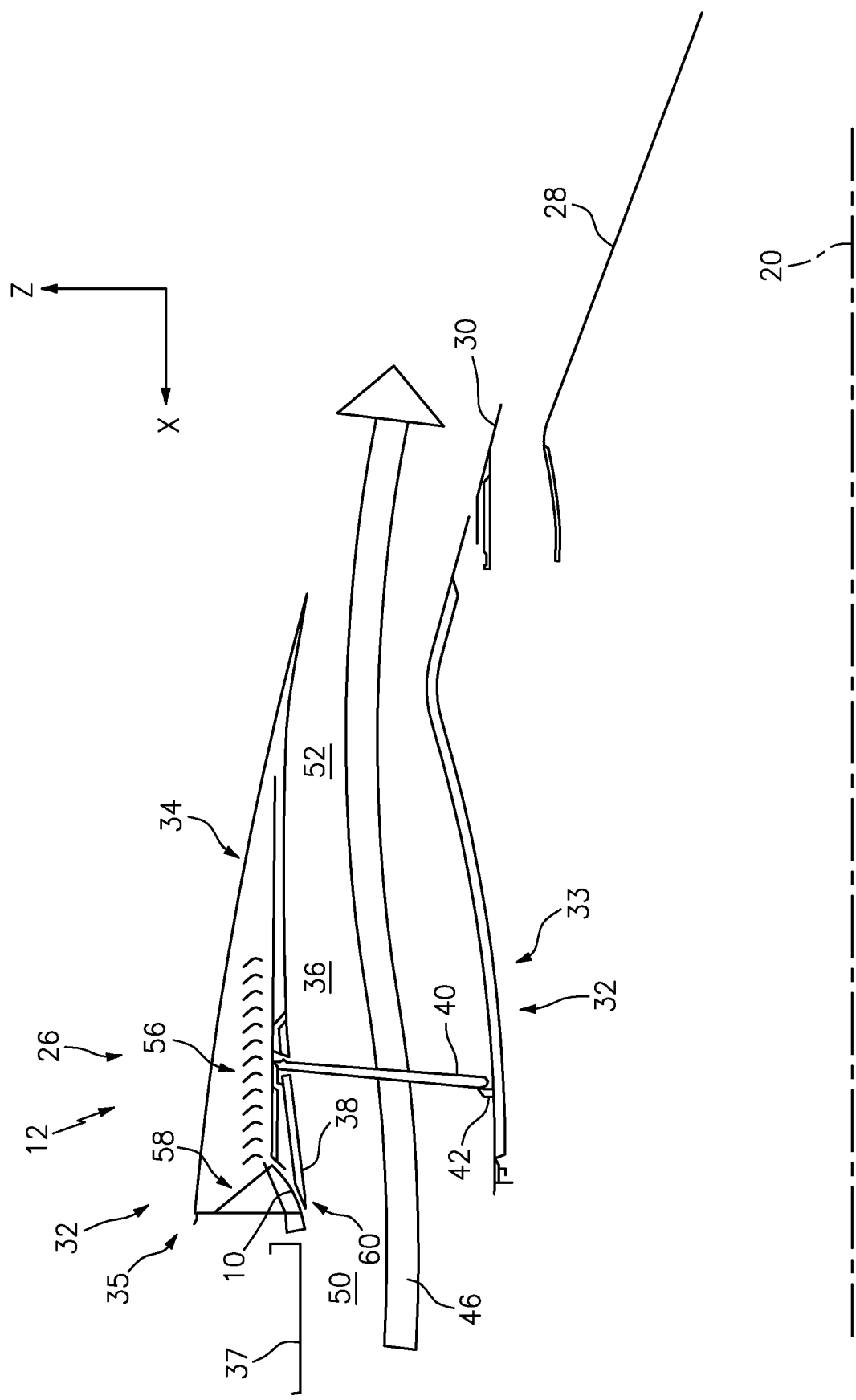
FIG. 3 is a sectional schematic view of a thrust reverser, exhaust centerbody, and exhaust nozzle portions of a nacelle that is included in the engine of FIG. 1, where a translating structure and blocker doors of the thrust reverser are in their respective stowed positions.
Figure 4:
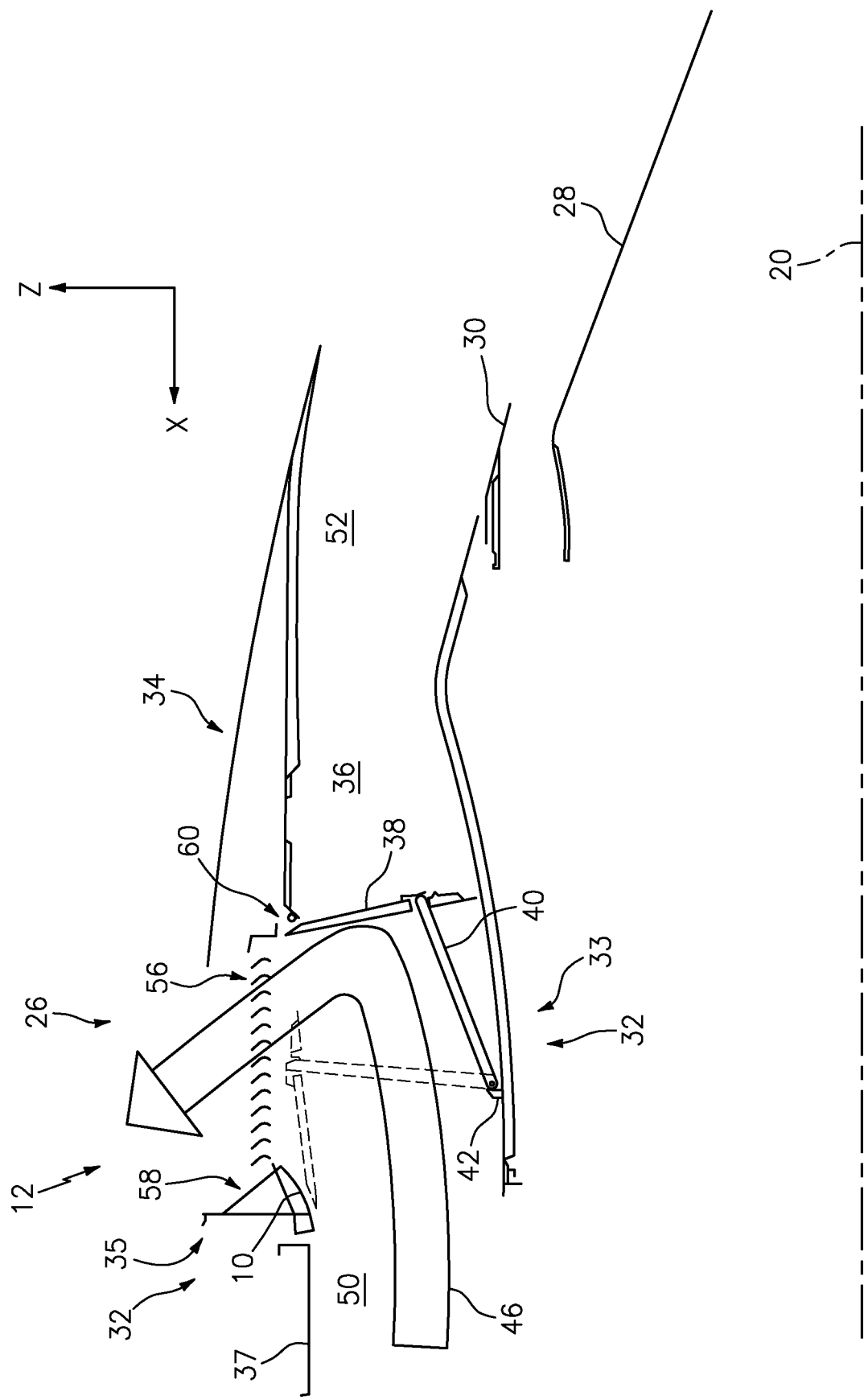
FIG. 4 is a sectional schematic view of the thrust reverser, the exhaust centerbody, and the exhaust nozzle portions of the nacelle that is included in the engine FIG. 1, where the translating structure and the blocker doors of the thrust reverser are in their respective deployed positions.
Figure 5:
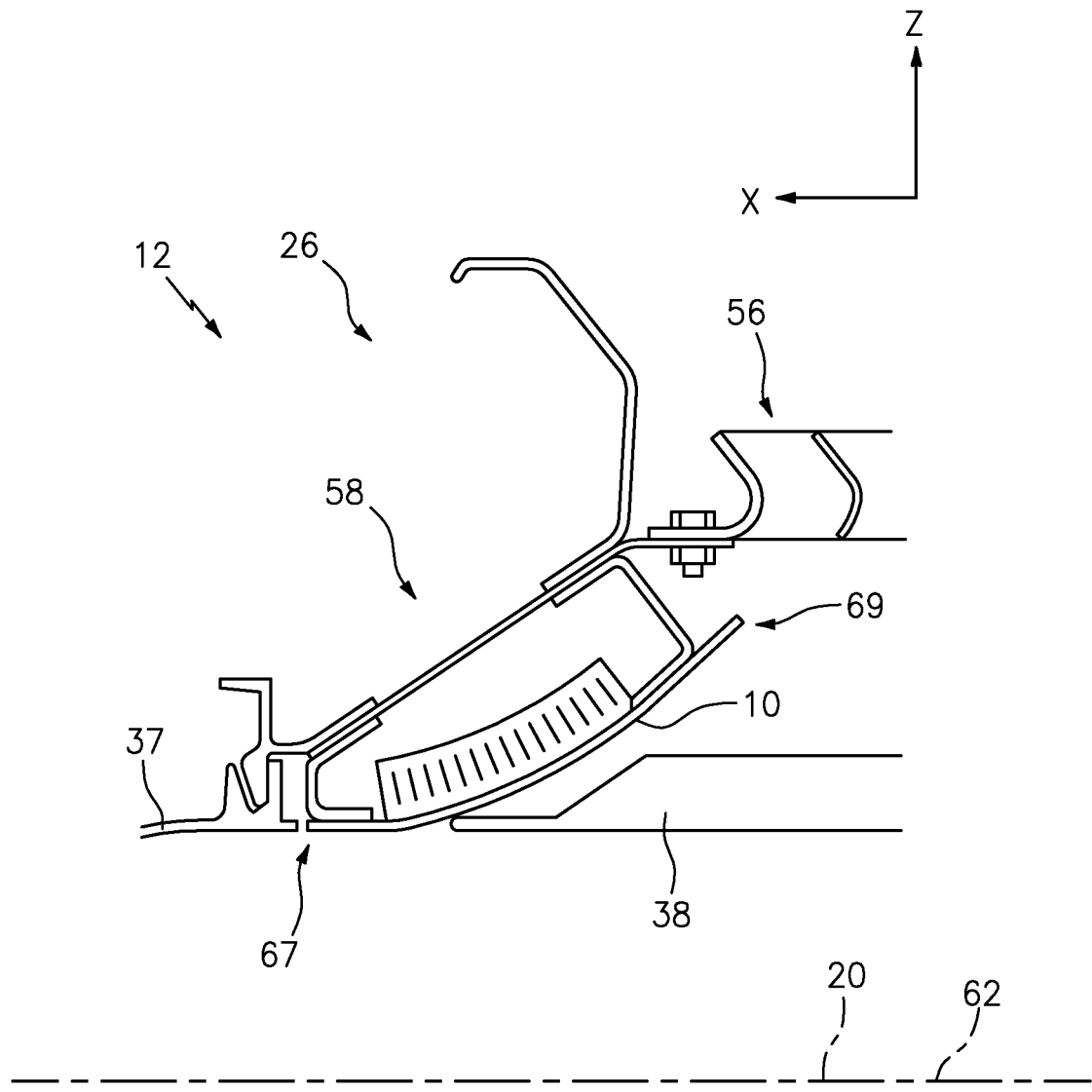
FIG. 5 is a sectional view of a prior art thrust reverser portion of a nacelle that may be included in the engine system of FIG. 1.

Referring now to FIGS. 3 and 4, in this embodiment the thrust reverser 26 is a cascade type thrust reverser that includes a fixed structure 32 and a translating structure 34. The fixed structure 32 and the translating structure 34 partially define a bypass duct 36; the bypass duct 36 extends circumferentially about the centerline 20; the fixed structure 32 includes a radially inner portion 33 and a radially outer portion 35. The radially outer portion 35 of the fixed structure 32 extends axially from the aft end of a fan case 37 that surrounds the fan section 44 of the gas turbine engine 16 (FIG. 2). The translating structure 34 is selectively moveable in a generally lengthwise direction relative to the fixed structure 32, between a stowed position (FIG. 3) (e.g., during a forward thrust operation) and a deployed position (FIG. 4) (e.g., during a thrust reversing operation). The translating structure 34 engages a track of an upper track beam (not shown) and a track of a lower track beam (not shown) in a manner that permits the movement of the translating structure 34 between the stowed position (FIG. 3) and the deployed position (FIG. 4). The track of the upper track beam (not shown) extends in a generally lengthwise direction along an upper area of the nacelle 12 (shown in FIGS. 3 and 4); the track of the lower track beam (not shown) extends in a generally lengthwise direction along a lower area of the nacelle 12 (not shown in FIGS. 3 and 4).

The translating structure 34 includes a plurality of blocker doors 38, each of which is pivotably connected to the radially inner portion 33 of the fixed structure 32 by a drag link 40 and a drag link fitting 42. Each of the blocker doors 38 is moveable between a stowed position (FIG. 3) (e.g., during a forward thrust operation of the nacelle 12) and a deployed position (FIG. 4) (e.g., during a thrust reversing operation of the nacelle 12). The blocker doors 38 are configured to be in their respective stowed positions (FIG. 3) when the translating structure 34 is in its stowed position (FIG. 3). The blocker doors 38 are configured to be in their respective deployed positions (FIG. 4) when the translating structure 34 is in its deployed position (FIG. 4). When the blocker doors 38 are in the respective stowed positions (FIG. 3), the blocker doors 38 are positioned proximate the translating structure 34 and each blocker door 38 extends in a direction that is generally parallel to the centerline 20. When the blocker doors 38 are in the respective deployed positions (FIG. 4), the blocker doors 38 are positioned away from the translating structure 34 and each blocker door 38 extends in a direction that is generally perpendicular to the centerline 20. FIGS. 3 and 4 illustrate the relative positioning of the fan case 37, and the thrust reverser 26, the exhaust centerbody 28, and the exhaust nozzle 30 portions of the nacelle 12.

Referring to FIG. 2, during operation of the engine system 14 in this embodiment, an airstream (not shown) enters the gas turbine engine 16 through a fan section 44 that is located at a forward end of the gas turbine engine 16. The airstream is thereafter divided into at least a core airstream (not shown) and a bypass airstream 46 (FIGS. 3 and 4). In this embodiment, the core airstream enters the gas turbine engine 16, where it is accelerated and then discharged through an aft end of the gas turbine engine 16. The core airstream is then finally discharged through the exhaust nozzle 30 portion of the nacelle 12 to provide forward thrust. In the embodiment illustrated in FIGS. 3 and 4, when the translating structure 34 is in its stowed position (FIG. 3), the bypass airstream 46 can pass from a forward end 50 of the bypass duct 36 to an aft end 52 of the bypass duct 36, through which it can be discharged to provide forward thrust. The drag links 40 each block only a small circumferential portion of the bypass duct 36, and thus the bypass airstream 46 can pass around them relatively easily. The translating structure 34 covers an array of cascades 56 that are included in the radially outer portion 35 of the fixed structure 32 of the thrust reverser 26, thereby blocking the bypass airstream 46 from passing through the array of cascades 56. When the translating structure 34 is in its deployed position (FIG. 4), the array of cascades 56 is exposed, and the blocker doors 38 are deployed to redirect substantially all of the bypass airstream 46 toward the array of cascades 56, through which the bypass airstream 46 can be discharged to generate reverse thrust. The array of cascades 56 extends circumferentially about the centerline 20 of the gas turbine engine 16.

The fan ramp 10 is an aerodynamic surface that is active during a thrust reversing operation of the nacelle 12 (e.g., when the translating structure 34 is in its deployed position and the blocker doors 38 are in their respective deployed positions (FIG. 4)). The fan ramp 10 may be formed on and/or defined by various different components of the nacelle 12. The fan ramp 10 may be formed on and/or defined by one or more components of the radially outer portion 35 of the fixed structure 32 of the thrust reverser 26. In the embodiment illustrated in FIGS. 3 and 4, the fan ramp 10 is defined by an annular torque box 58, which is a component of the radially outer portion 35 of the fixed structure 32 of the thrust reverser 26. In this embodiment, the fan ramp 10 is disposed immediately forward of the array of cascades 56 such that the fan ramp 10 extends between an aft end of the fan case 37 and a forward end of the array of cascades 56. In this embodiment, when the blocker doors 38 of the translating structure 34 are in their respective stowed positions (FIG. 3), the forward edge 60 of each blocker door 38 abuts the fan ramp 10. When the blocker doors 38 of the translating structure 34 are in their respective deployed positions (FIG. 4), the fan ramp 10 is exposed to the bypass airstream 46 that passes through the bypass duct 36. When the blocker doors 38 of the translating structure 34 are in their respective deployed positions (FIG. 4), the fan ramp 10 aids in guiding the bypass airstream 46 to make a radially outward turn from the bypass duct 36 through the array of cascades 56.

The fan ramp 10 can be configured in various different ways. In a prior art embodiment in FIG. 5, the fan ramp 10 extends circumferentially about an axial fan ramp centerline 62. The fan ramp 10 is disposed relative to the gas turbine engine 16 such that the fan ramp centerline 62 is aligned with the centerline 20 of the gas turbine engine 16, and the fan ramp 10 extends axially between a fan ramp forward edge 67 and a fan ramp aft edge 69. The fan ramp forward edge 67 is disposed proximate the aft end of the fan case 37 and the fan ramp aft edge 69 is disposed proximate the forward end of the array of cascades 56.

The fan ramp 10 includes a noise suppression feature that attenuates noise within the bypass duct 36 (FIGS. 3 and 4). The noise can be caused, for example, by the high speed rotation of the fan in the fan section 44 of the gas turbine engine 16 (FIG. 2), and/or turbulent flow of the bypass airstream 46 within the bypass duct 36. The noise suppression feature is included on portions of the fan ramp 10 within the torque box and exposed to the bypass duct 36 when the blocker doors 38 are in their respective stowed positions.

Figure 6:
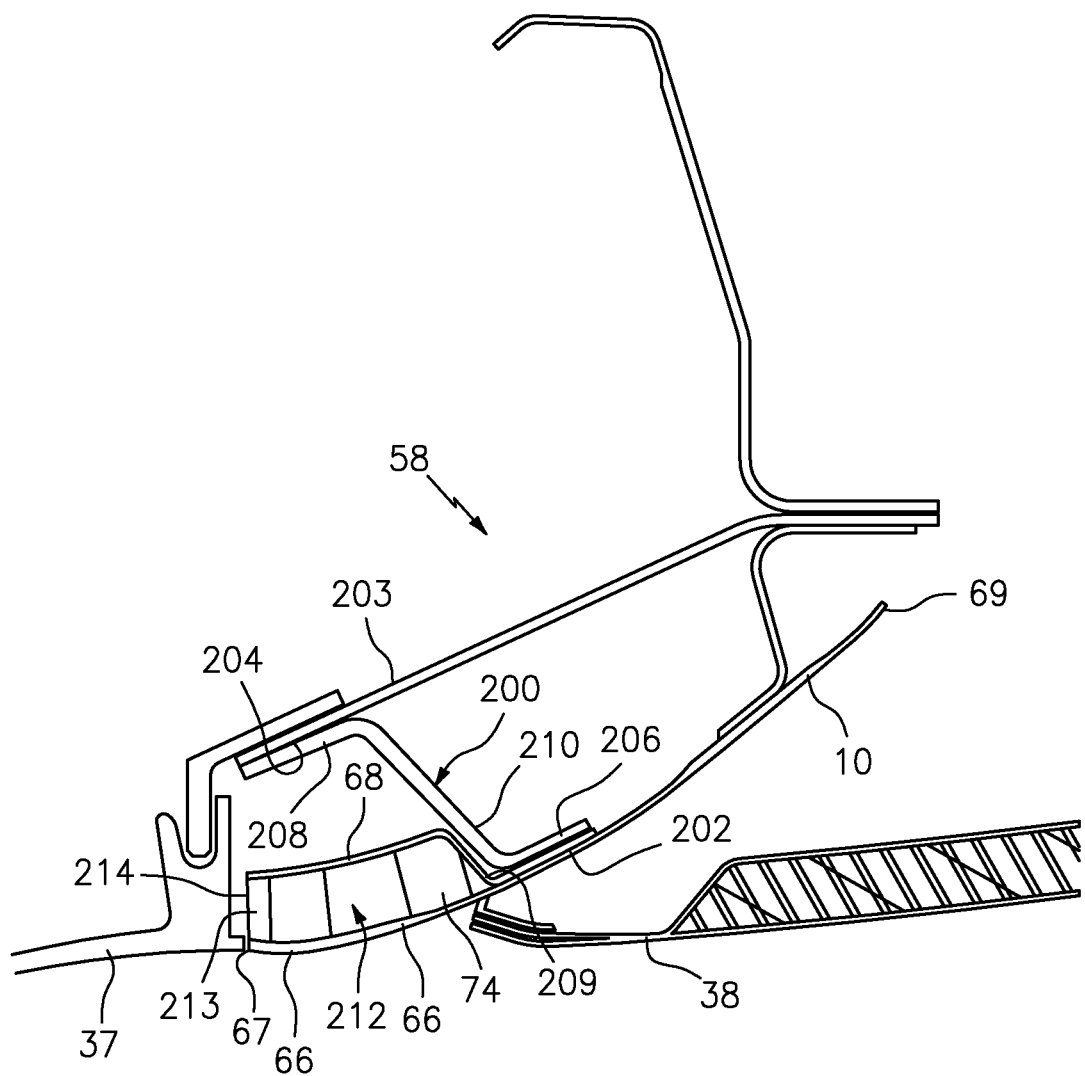
FIG. 6 is a sectional view of a thrust reverser portion of the nacelle that is included in the engine system of FIG. 1.

FIG. 6 is a sectional view of a thrust reverser portion of the nacelle that is included in the engine system of FIG. 1. In this embodiment, noise attenuation features may be located forward of the torque box 58. Torque box bracket 200 defines a forward boundary of the torque box 58, and the torque box bracket 200 is attached (e.g., welded, blinder fastener, etc) to the fan ramp 10 at a first location 202 and attached to torque box cone 203 at a second location 204. The placement of the brackets is generally determined by the length of acoustic treatment forward of the stowed blocker door forward edge. The bracket 200 may include a plurality of segments, including a first segment 206 that attaches the bracket at the first location 202, and a second segment 208 that attached the bracket 200 at the second location 204. The bracket 200 also includes a central segment 210 that extends between the first and second segments, 206, 208, respectively. The central segment 210 may extend radially inward as the central segment extends aft.

A radially outer surface of the fan ramp forward edge 67 includes a noise suppression structure 212 that attenuates noise at an inner surface of a forward section of the fan ramp 10. The noise suppression structure 212 may be configured in various different ways. In some embodiments, the noise suppression structure 212 may be formed by and/or defined by a structure that is disposed relative to at least a portion of the fan ramp 10. The noise suppression structure 212 is formed by and/or defined by the one or more components of the nacelle 12 that form and/or define the fan ramp 10. An edge seal 213 may be used at a forward axial end 214 of the fan ramp 10.

Figure 7:
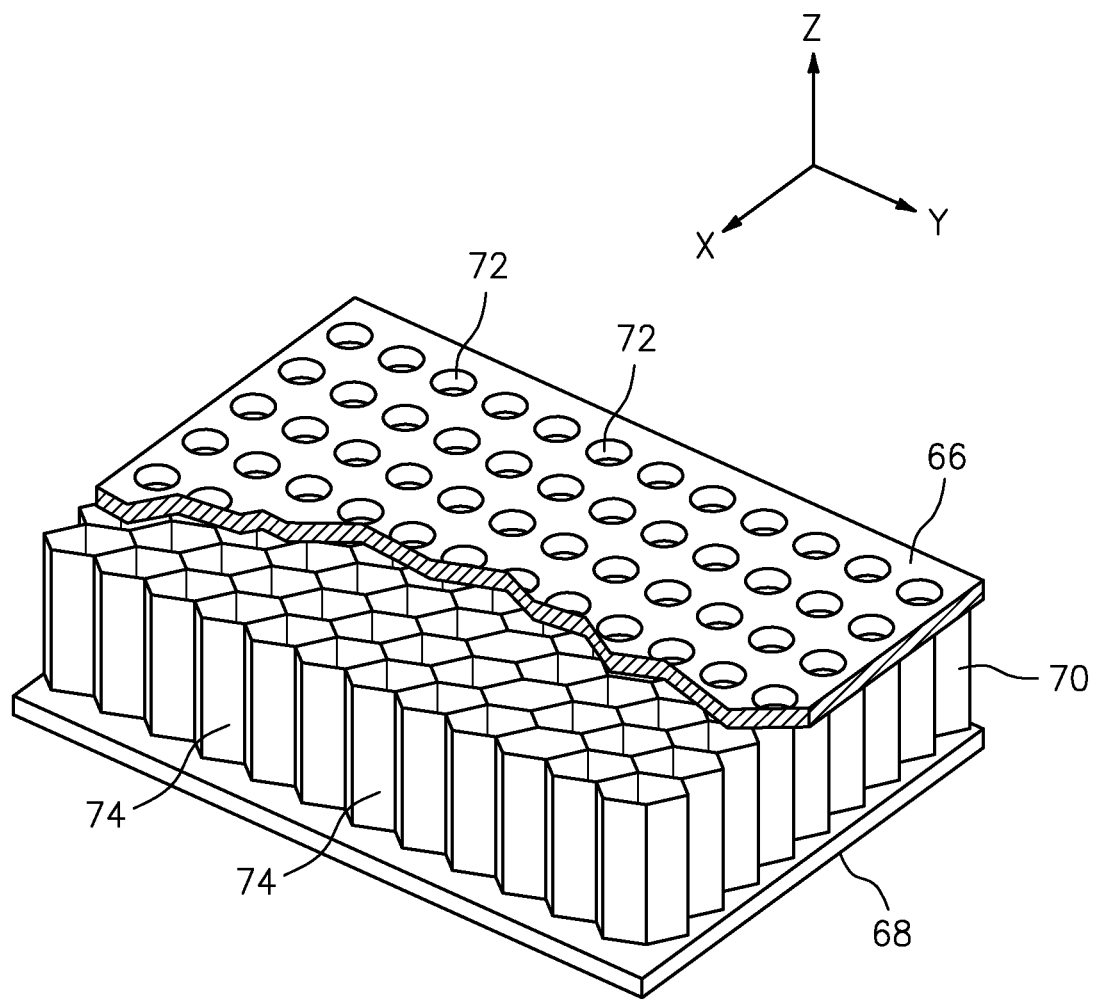
FIG. 7 is a perspective view of the forward portion of the thrust reverser fan ramp that is included in the engine of FIG. 1.

FIG. 7 is a section view of one embodiment of the noise suppression structure 212. Referring to FIGS. 6 and 7, the structure 212 includes a perforated layer 66, an imperforate base layer 68, and a core layer 70, all of which are stacked in a superimposed relationship so that the core layer 70 is disposed between the perforated layer 66 and the base layer 68. In the structure shown in FIG. 7, the perforated layer 66 includes a plurality of apertures 72 that are configured to permit noise to pass through; the core layer 70 includes a plurality of honeycomb-shaped substructures 74; each substructure 74 is operable receive an amount of the noise that passes through one or more of the apertures 72 in the perforated layer 66; and each substructure 74 is operable to reflect the noise back out of the apertures 72 such that sound waves of the reflected noise are out of phase and destructively interfere with sound waves of noise outside the substructure 74 in a known manner. The structure shown in FIG. 7 is positioned outside the torque box 58 such that the perforated layer 66 forms a radially inner surface and the base layer 68 forms a radially outer surface, as shown in FIG. 7. In some embodiments similar to the one illustrated in FIG. 8, the substructure 74 can be configured (or "tuned") to suppress noise having one or more predetermined wavelengths. In such embodiments, the predetermined wavelengths can correspond to one or more wavelengths of the noise that may be present within the engine system 14.

Referring again to FIG. 6, the base layer 68 may extend aft and radially inward to attach to the first segment 206 of the torque box bracket 200 at the first location 202. The noise attenuating structure 212 includes the forward axial end 214 and an aft axial end 209.

Figure 8:
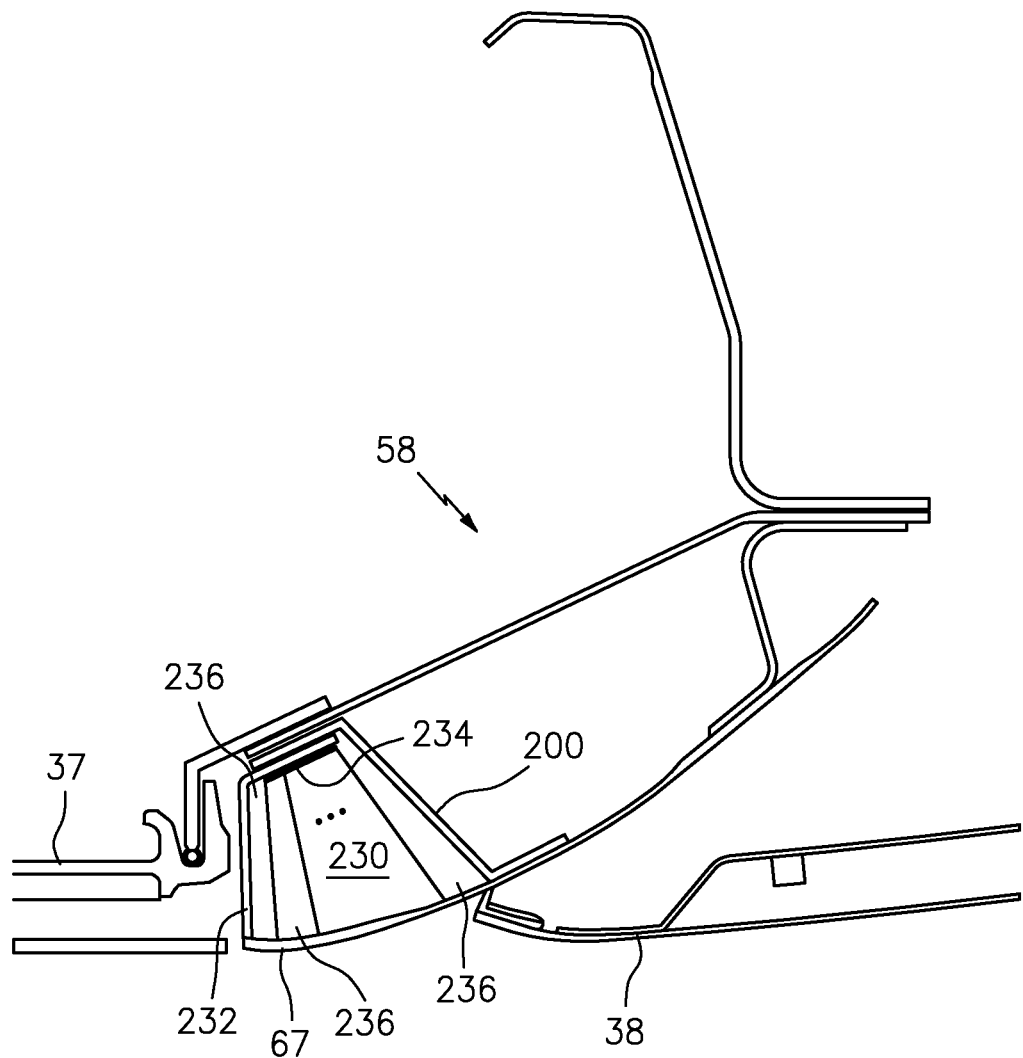
FIG. 8 is a sectional view of an alternative embodiment of a thrust reverser portion of the nacelle that is included in the engine of FIG. 1.

FIG. 8 is a sectional view of an alternative embodiment of a thrust reverser portion of the nacelle that is included in the engine system of FIG. 1. In this embodiment the fan ramp forward edge 67 may form a resonating cavity 230 (e.g., trapezoidal) along with forward bracket 232 and the torque box bracket 200. The forward bracket 232 is located aft of the fan case 37 and is attached (e.g., welded) to the fan ramp forward edge 67, and attached and radially stacked with the second segment 208 of the torque box bracket 200. In this embodiment the fan ramp forward edge, axially forward of the stowed blocker door forward edge, may be a perforated surface, and back surface 234 and the bracket 200 may be non-perforated. A plurality of honeycomb-shaped substructures 236 may extend between the perforated fan ramp forward edge 67 and the back surface 234 to provide a noise attenuating structure. The volume of the resonating cavity 230 and size of the perforations in the fan ramp forward edge may be selected based upon the desired noise frequency band to be attenuated.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fan ramp for use in a thrust reverser portion of a nacelle of a gas turbine engine, the fan ramp extending circumferentially about an axial fan ramp centerline, the fan ramp comprising:
   a fan ramp forward edge disposed proximate an aft end of a fan case, the fan case at least partially surrounding a fan section of the gas turbine engine;
   a fan ramp aft edge disposed proximate a forward end of an array of cascades, the array of cascades being operable to permit a bypass airstream to pass therethrough during a thrust reversing operation; and
   a noise attenuating structure comprising a perforated layer, a base layer, and a core layer, all of which are stacked in a superimposed relationship so that the core layer is disposed between the perforated layer and the base layer;
   wherein the perforated layer is configured to permit noise to pass therethrough, the core layer includes a substructure that is operable to receive an amount of the noise that passes through the perforated layer that is operable to reflect the amount of the noise off the base layer such that sound waves of reflected noise are out of phase with and destructively interfere with sound waves of noise outside the substructure;
   wherein the core layer comprises and axially extends between a forward axial end proximate the fan ramp forward edge and an aft axial end, and the core layer is axially forward of a torque box forward bracket that forms a forward boundary of a torque box; and
   wherein the forward end of the noise attenuating structure comprises an edge seal disposed between the perforated layer and the base layer, and wherein the core layer is not disposed aft of the torque box forward bracket and the base layer is radially inward of and radially separated from a segment of the torque box forward bracket.

2. The fan ramp of claim 1, wherein the fan ramp is exposed to the bypass airstream passing through a bypass duct of the gas turbine engine during the thrust reversing operation.

3. The fan ramp of claim 2, wherein the fan ramp aids in guiding the bypass airstream to make a radially outward turn from the bypass duct through the array of cascades during the thrust reversing operation.

4. The fan ramp of claim 2, wherein the stacked perforated layer, base layer, and core layer are operable to suppress noise within the bypass duct when the blocker door is in a stowed position.

5. The fan ramp of claim 1, wherein the fan ramp centerline is aligned with an axial centerline of the gas turbine engine.

6. The fan ramp of claim 1, wherein the stacked perforated layer, base layer, and core layer are defined by a component of the nacelle that at least partially defines the fan ramp.

7. The fan ramp of claim 1, wherein the substructure is honey-comb shaped.

8. The fan ramp of claim 1, wherein the fan ramp is free of perforations exposed to the bypass airstream axially aft of the torque box forward bracket.

9. The fan ramp of claim 8, wherein the base layer abuts a segment of the torque box forward bracket.

10. The fan ramp of claim 1, wherein the base layer abuts a segment of the torque box forward bracket.

11. A method of attenuating noise, comprising:
   providing a fan ramp for use in a thrust reverser portion of a nacelle of a gas turbine engine, the fan ramp extending circumferentially about an axial fan ramp centerline, the fan ramp comprising a fan ramp forward edge disposed proximate an aft end of a fan case, the fan case at least partially surrounding a fan section of the gas turbine engine, a fan ramp aft edge disposed proximate a forward end of an array of cascades, the array of cascades being operable to permit a bypass airstream to pass therethrough during a thrust reversing operation, and a noise attenuating structure comprising a perforated layer, a base layer, and at least one of a core layer or a hollow layer, all of which are stacked in a superimposed relationship so that the at least one of the core layer or the hollow layer is disposed between the perforated layer and the base layer; and porting noise through the perforated layer such that sound waves of reflected noise are out of phase with and destructively interfere with sound waves of noise outside a substructure of the at least one of the core layer or the hollow layer, where the at least one of the core layer or the hollow layer comprises and axially extends between a forward axial end proximate the fan ramp forward edge and an aft axial end, and the at least one of the core layer or the hollow layer is axially forward of a torque box forward bracket that forms a forward boundary of a torque box wherein the forward end of the noise attenuating structure comprises an edge seal disposed between the perforated layer and the base layer, and wherein the core layer is not disposed aft of the torque box forward bracket and the base layer is radially inward of and radially separated from a segment of the torque box forward bracket.

12. The method of claim 11, wherein the fan ramp is free of perforations exposed to the bypass airstream axially aft of the torque box forward bracket.

\* \* \* \* \*